United States Patent
Tang et al.

(10) Patent No.: US 12,557,559 B2
(45) Date of Patent: Feb. 17, 2026

(54) IRON-COBALT BASED TARGET

(71) Applicants: SOLAR APPLIED MATERIALS TECHNOLOGY CORP., Tainan (TW); National Tsing Hua University, Hsinchu (TW)

(72) Inventors: Chih-Wen Tang, Tainan (TW); Chih-Huang Lai, Tainan (TW); Wei-Chih Huang, Tainan (TW); Chun-Liang Yang, Tainan (TW); Kuan-Ling Ou, Tainan (TW)

(73) Assignees: SOLAR APPLIED MATERIALS TECHNOLOGY CORP., Tainan (TW); NATIONAL TSING HUA UNIVERSITY, Hsinchu (TW)

( * ) Notice: Subject to any disclaimer, the term of this patent is extended or adjusted under 35 U.S.C. 154(b) by 757 days.

(21) Appl. No.: 17/874,593

(22) Filed: Jul. 27, 2022

(65) Prior Publication Data

US 2023/0397503 A1 Dec. 7, 2023

(30) Foreign Application Priority Data

Jun. 7, 2022 (TW) ................................. 111121078

(51) Int. Cl.
  *H10N 50/85* (2023.01)
  *H01F 10/32* (2006.01)
  (Continued)

(52) U.S. Cl.
  CPC ......... *H10N 50/85* (2023.02); *H01F 10/3254* (2013.01); *H01F 10/3268* (2013.01);
  (Continued)

(58) Field of Classification Search
  CPC ........ H10N 50/85; H10N 50/80; H10N 50/01; H10N 50/10; H01F 10/3254;
  (Continued)

(56) References Cited

U.S. PATENT DOCUMENTS

2018/0245211 A1* 8/2018 Hasegawa ............. C22C 38/002
2020/0006625 A1* 1/2020 Oguz .................... H01F 10/329
(Continued)

FOREIGN PATENT DOCUMENTS

CN 101691637 A 4/2010
CN 102324506 A * 1/2012
(Continued)

OTHER PUBLICATIONS

Yong-Le Lou et. al, "Effect of thickness and annealing on crystallization of MgO in magnetic tunnel junction structure," 2012 IEEE International Conference on Electron Devices and Solid State Circuit (EDSSC), Bangkok, 2012, pp. 1-3, doi: 10.1109/EDSSC.2012.6482781 (Year: 2012).*

*Primary Examiner* — Sitaramarao S Yechuri
(74) *Attorney, Agent, or Firm* — WPAT, PC

(57) ABSTRACT

Provided is a ferromagnetic free layer, comprising Fe, Co, B and an additive metal, and based on a total atomic number of the ferromagnetic free layer, a content of Co is more than 0 at % and less than 30 at %, a content of B is more than 10 at % and less than or equal to 35 at %, and a content of the additive metal is more than or equal to 2 at % and less than 10 at %; the additive metal comprises Mo, Re or a combination thereof, and a thickness of the ferromagnetic free layer is more than or equal to 1.5 nm and less than 2.5 nm. The ferromagnetic free layer can be applied to a MTJ structure as a single layer, and has sufficient thermal stability for maintaining good magnetic properties after thermal treatment, which makes sure that the MTJ structure can exert normal recording function.

2 Claims, 1 Drawing Sheet

(51) Int. Cl.
*H10B 61/00* (2023.01)
*H10N 50/80* (2023.01)
*C22C 38/10* (2006.01)

(52) U.S. Cl.
CPC ............ *H10B 61/00* (2023.02); *H10N 50/80* (2023.02); *C22C 38/10* (2013.01); *H01F 10/3286* (2013.01)

(58) Field of Classification Search
CPC . H01F 10/3268; H01F 10/3286; H10B 61/00; C22C 38/10
See application file for complete search history.

(56) References Cited

U.S. PATENT DOCUMENTS

| | | | |
|---|---|---|---|
| 2022/0068538 A1* | 3/2022 | Apalkov | ............... H01F 41/307 |
| 2022/0139435 A1 | 5/2022 | Santos et al. | |

FOREIGN PATENT DOCUMENTS

| | | | | |
|---|---|---|---|---|
| KR | 20070042891 A | * | 4/2007 | |
| KR | 10-2012-0011372 A | | 2/2012 | |
| KR | 10-2018-0038944 A | | 4/2018 | |
| KR | 10-2020-0057610 A | | 5/2020 | |
| TW | 201715046 A | | 5/2017 | |

\* cited by examiner

IRON-COBALT BASED TARGET

CROSS-REFERENCE TO RELATED APPLICATION

Pursuant to 35 U.S.C. § 119(a), this application claims the benefits of the priority to Taiwan Patent Application No. 111121078, filed Jun. 7, 2022. The contents of the prior application are incorporated herein by its entirety.

BACKGROUND OF THE INVENTION

1. Field of the Invention

The instant disclosure relates to a non-volatile memory (NVM), particularly to a ferromagnetic free layer for a magnetoresistive random access memory (MRAM). In addition, the instant disclosure also relates to a laminated structure comprising the foresaid ferromagnetic free layer, a magnetic tunnel junction (MTJ) structure, an MRAM, and an iron-cobalt based target for preparing the foresaid ferromagnetic free layer.

2. Description of the Prior Arts

Memory can be classified into volatile and non-volatile categories. Volatile memory loses its stored data once the power is switched off. Examples of volatile memory include dynamic random access memory (DRAM) and static random access memory (SRAM). Unlike volatile memory, non-volatile memory retains its stored data even when the power is switched off. In the non-volatile memory devices, according to whether the stored data can be rewritten at any time when in use, they can be classified into read-only memory (ROM) and flash memory. Flash memory with erase-rewrite functions has been widely used in various electronic products; however, it cannot provide read and write speeds that keep up with the increased processor speed of the modern central processing unit (CPU) and has faced the limitations of miniaturization and efficiency optimizations. Therefore, the development of next-generation memory (NGM) is considered necessary in the era of information explosion.

Candidates of NGM include MRAM, ferroelectric random access memory (FRAM), phase-change random access memory (PRAM), resistive random access memory (RRAM), and carbon nanotube random access memory (CNT-RAM). MRAM features read and write speeds comparable with SRAM, a high storage capacity like DRAM, and a cycling endurance over $10^{10}$ times more than the flash memory, making MRAM the most anticipated NGM in the markets.

The advent of MRAM elements comes from the advance of giant magnetoresistance (GMR) and spin-transfer torque (STT) effects. GMR effect is observed in a laminate composed of ferromagnetic layer/non-ferromagnetic layer/ferromagnetic layer as electrons with different spin orientations tunneling the ferromagnetic layers have different electron conductivities. The electrical resistance depends on an external magnetic field, and change of the electrical resistance can reach 100% at low temperature. STT is accomplished by the MTJ involving the tunneling magnetoresistance (TMR) effect. Unlike the laminate structure of GMR, an insulation layer which replaces the non-ferromagnetic layer is disposed between two ferromagnetic layers in an MTJ structure. When the magnetization directions of both ferromagnetic layers are parallel (P), a low electrical resistance ($R_P$) is measured. When the magnetization directions of both ferromagnetic layers are antiparallel (AP), a high electrical resistance ($R_{AP}$) is measured. The change of the electrical resistance, which is also called TMR ratio and defined by $$TMR(\%) = \frac{R_{AP} - R_P}{R_P} \times 100\%,$$

can be typically above 100% by controlling the magnetization direction of two ferromagnetic layers to be parallel or antiparallel, resulting in that MTJ becomes the basic unit for information storage in MRAM element.

At the early stage of development, the shape magnetic anisotropy of the ferromagnetic layer rendered the magnetic moment in MTJ horizontal magnetic anisotropy (HMA). Therefore, neither the adoption of specific material or structure system nor an additional thermal treatment is required, making the process and material design of said MTJ structure simple and easy. However, the MTJ structure with HMA still has a problem of insufficient thermal stability.

Thermal Stability, denoted by A, can be evaluated by the calculation of $$\Delta = \frac{M_S H_k V}{2 k_B T}$$

in which $M_S$, $H_k$, V, $k_B$, and T are saturated magnetization, anisotropic field, volume, Boltzmann constant, and absolute temperature, respectively. The less the value of Δ, the inferior the thermal stability, resulting in that the free layer is more likely to spontaneously switch its magnetic state and causes the recording error. To meet the back-end process, the thermal stability of MRAM elements is currently required to be at least 40, or even 60 or more. However, it is difficult for the MTJ structure with HMA to meet the foresaid criteria.

The magnetic anisotropy of the MTJ structure has been shifted from HMA to perpendicular magnetic anisotropy (PMA) to overcome the problem of insufficient thermal stability of MTJ structure with HMA and to achieve the goal of miniaturization of elements. However, the PMA cannot be increased to a certain level unless the magneto-crystalline anisotropy and the interface magnetic anisotropy of the material are modified. For instance, either the use of a relatively high (111)-oriented FePt layer or growth of the multilayered ferromagnetic laminate, such as $[Co/Pd]_n$ laminate, $[Co/Pt]_n$ laminate, and $[Co/Ni]_n$ laminate, on a (111)-oriented seed layer made of tantalum (Ta), palladium (Pd), platinum (Pt), or ruthenium (Ru) is useful to enhance PMA. Nevertheless, the foresaid methods would bring problems of process complexity and control difficulty, and the thermal stability would drop to a quarter left as the size of MRAM element is halved. Therefore, the thermal stability of the MTJ structure with PMA also needs to be further optimized.

With reference to FIG. 1, a basic structure of the MRAM element mainly comprises a bottom electrode 10, a pinning layer 20, a reference layer 30 (also called pinned layer), a tunneling barrier layer 40, a free layer 50, and a top electrode 60. The MTJ structure for information storage consists of the ferromagnetic reference layer 30 and the ferromagnetic free layer 50 separated by an insulating tunneling barrier layer 40, such as magnesium oxide (MgO) layer.

The pinning layer in the MRAM element is designed to fix the magnetization direction of the reference layer. For the reference layer, one of the important requirements is that its magnetization direction has to be fixed all the time even under excessive current, heat or magnetic field, so that the spin directions of the tunneling or polarized electrons can be maintained. Unlike the fixed magnetization direction of the reference layer, the magnetization direction of the free layer can be switched with STT effect by micro-current injection, allowing the magnetization directions of the free layer and the reference layer to be paired as parallel or antiparallel state. As stated above, when the magnetization directions of the free layer and the reference layer are parallel, electrons tunnel through the tunneling barrier layer more easily, exhibiting a low resistance state (LRS) recorded as "0". In contrast, when the magnetization directions of the free layer and the reference layer are antiparallel, electrons tunnel through the tunneling barrier layer more hardly, exhibiting a high resistance state (HRS) stored as "1". The information can be stored by the switching of the "0" and "1" states.

Further, the MRAM element involves two indispensable thermal treatment stages. One is an annealing thermal treatment, which is usually conducted at about 450° C., and is used to enhance TMR effect and PMA, while the other is a thermal treatment of back-end of line (BEOL) for complementary metal-oxide-semiconductor (CMOS). The temperature of thermal treatment of BEOL is mostly as high as 500° C. Accordingly, in order to prevent the magnetic property of the MTJ structure of the MRAM element from a serious damage, or even losing the recording function after a thermal treatment at high temperature, it is necessary to further improve the thermal stability of the MRAM element.

Considering the foresaid problems of miniaturization of elements and insufficient thermal stability, the free layer of the MTJ structure has been changed from a single layer consisting of iron (Fe), cobalt (Co) and boron (B) to a composite layer having a multi-layered structure, such as an iron-cobalt-boron layer (FeCoB layer), a non-ferromagnetic spacing layer and an insulating layer, etc., thereby obtaining an improved thermal stability. For example, the foresaid composite layer can be obtained by sequentially disposing a non-ferromagnetic spacing layer consisting of non-ferromagnetic materials such as tungsten (W), molybdenum (Mo) or Ta, another FeCoB layer and an MgO layer on the original FeCoB layer. However, obtaining the foresaid composite layer having a multi-layered structure inevitably increases the difficulty of the film forming process. Especially, both the foresaid non-ferromagnetic spacing layer and the MgO layer are quite thin, such that the difficulty of film forming process is high, and the film uniformity is relatively hard to control, which leads to higher difficulty for physical vapor deposition. Moreover, the complicated multi-layered structure of the composite layer also increases the difficulty of the follow-up etching process. That is, although the thermal stability of the MTJ structure can be improved by adopting the composite layer as the free layer, the difficulty and complexity of the film formation and the etching process are increased simultaneously, thereby increasing the cost of the process and greatly limiting the mass productivity and competitiveness of the MRAM element.

Therefore, there is still a need to improve and research the ferromagnetic free layer of the MTJ structure, so as to mitigate the problems of increasing difficulty and cost of the manufacturing process derived from adopting a composite layer having a multi-layered structure as the free layer for improving the thermal stability.

SUMMARY OF THE INVENTION

In view of the problems in the prior art, an objective of the instant disclosure is to provide a ferromagnetic free layer, which can be applied to a MTJ structure as a single layer, and also can improve the thermal stability of the MRAM element. That is, the ferromagnetic free layer of the instant disclosure, which does not involve high difficulty and high cost manufacturing process, can maintain its good magnetic property even after being subjected to a thermal treatment at about 450° C., thereby ensuring the normal recording function of the MTJ structure comprising the same.

To achieve the foresaid objective, the instant disclosure provides a ferromagnetic free layer, which comprises Fe, Co, B and an additive metal, and based on a total atomic number of the ferromagnetic free layer, a content of Co is more than 0 atomic percent (at %) and less than 30 at %, a content of B is more than 10 at % and less than or equal to 35 at %, and a content of the additive metal is more than or equal to 2 at % and less than 10 at %; wherein the additive metal comprises Mo, rhenium (Re) or a combination thereof, and a thickness of the ferromagnetic free layer is more than or equal to 1.5 nanometers (nm) and less than 2.5 nm.

With the technical means of controlling the contents of Co and B, adding the specific content of the specific additive metal and controlling the thickness of the ferromagnetic free layer, the ferromagnetic free layer of the instant disclosure can be applied to a MTJ structure as a single layer, and has sufficient thermal stability to avoid a serious damage of its magnetic property after being subjected to a thermal treatment at high temperature, thereby ensuring the normal recording function of the MTJ structure. Meanwhile, as the ferromagnetic free layer of the instant disclosure is not a composite layer having a multi-layered structure, the ferromagnetic free layer also has advantages of relatively low difficulty and cost of the manufacturing process, which further increases its mass productivity and developmental value.

In some embodiments of the instant disclosure, based on the total atomic number of the ferromagnetic free layer, the content of Co is more than or equal to 5 at % and less than 30 at %. In another embodiment of the instant disclosure, based on the total atomic number of the ferromagnetic free layer, the content of Co is more than or equal to 10 at % and less than 30 at %. In still another embodiment of the instant disclosure, based on the total atomic number of the ferromagnetic free layer, the content of Co is more than or equal to 15 at % and less than 30 at %. In still another embodiment of the instant disclosure, based on the total atomic number of the ferromagnetic free layer, the content of Co is more than or equal to 10 at % and less than or equal to 25 at %. In still another embodiment of the instant disclosure, based on the total atomic number of the ferromagnetic free layer, the content of Co is more than or equal to 15 at % and less than or equal to 25 at %.

In some embodiments of the instant disclosure, based on the total atomic number of the ferromagnetic free layer, the content of B is more than or equal to 10.2 at % and less than or equal to 35 at %. In another embodiment of the instant disclosure, based on the total atomic number of the ferromagnetic free layer, the content of B is more than 10 at % and less than 27 at %.

In some embodiments of the instant disclosure, based on the total atomic number of the ferromagnetic free layer, the content of the additive metal is more than or equal to 2 at % and less than or equal to 9.9 at %. In another embodiment of the instant disclosure, based on the total atomic number of the ferromagnetic free layer, the content of the additive metal is more than or equal to 2 at % and less than or equal to 9.8 at %.

In some embodiments of the instant disclosure, based on the total atomic number of the ferromagnetic free layer, a content of Fe is more than or equal to 30 at % and less than or equal to 70 at %. In another embodiment of the instant disclosure, based on the total atomic number of the ferromagnetic free layer, a content of Fe is more than or equal to 35 at % and less than or equal to 70 at %. In still another embodiment of the instant disclosure, based on the total atomic number of the ferromagnetic free layer, a content of Fe is more than or equal to 35 at % and less than or equal to 65 at %. In still another embodiment of the instant disclosure, based on the total atomic number of the ferromagnetic free layer, a content of Fe is more than or equal to 39 at % and less than or equal to 65 at %.

In some embodiments of the instant disclosure, the thickness of the ferromagnetic free layer is more than or equal to 1.5 nm and less than or equal to 2.4 nm.

Besides, the instant disclosure further provides a laminated structure, which comprises a ferromagnetic free layer and a tunneling barrier layer, and the ferromagnetic free layer is disposed on a surface of the tunneling barrier layer; wherein, the ferromagnetic free layer is the foresaid ferromagnetic free layer of the instant disclosure, and a material of the tunneling barrier layer comprises MgO or MgO based materials.

By disposing the ferromagnetic free layer of the instant disclosure on the surface of the tunneling barrier layer, the laminated structure has good thermal stability, and can maintain good magnetic property even after being subjected to a thermal treatment at high temperature.

In accordance with the instant disclosure, the MgO based materials indicate composite materials that contain MgO and other additive elements. For example, the MgO based materials may be, but are not limited to, aluminum magnesium oxide, titanium magnesium oxide, gallium magnesium oxide, manganese magnesium oxide, silicon-aluminum-magnesium oxide, or zinc-aluminum-magnesium oxide.

In some embodiments of the instant disclosure, the material of the tunneling barrier layer may be MgO.

In accordance with the instant disclosure, a thickness of the tunneling barrier layer may be 0.1 nm to 2.0 nm.

Preferably, an anisotropic field ($H_k$) of the laminated structure is more than or equal to 4 kilooersted (kOe). More preferably, an $H_k$ of the laminated structure is more than or equal to 4 kOe and less than or equal to 10 kOe. Optionally, the $H_k$ of the laminated structure may be measured after being subjected to a thermal treatment; wherein, a condition of the thermal treatment may be heating at 350° C. to 500° C. for 1 minute to 2 hours. In one of the embodiments, the condition of the thermal treatment may be heating at 400° C. to 450° C. for 1 hour to 2 hours.

Preferably, a result of multiplying a magnetocrystalline anisotropy constant ($K_u$) of the laminated structure and a thickness of the ferromagnetic free layer is more than or equal to 0.3 ergon/square centimeter (erg/cm 2). The result of multiplying the $K_u$ of the laminated structure and the thickness of the ferromagnetic free layer may be abbreviated as "a quantitative indicator of effective magnetic layer", which can be used to evaluate the magnetic property. The higher the quantitative indicator of effective magnetic layer is, the better the magnetic property of the laminated structure. More preferably, the quantitative indicator of effective magnetic layer of the laminated structure is more than or equal to 0.3 erg/cm² and less than or equal to 0.5 erg/cm². Optionally, the $K_u$ of the laminated structure may be measured after the being subjected to a thermal treatment; wherein, a condition of the thermal treatment may be heating at 350° C. to 500° C. for 1 minute to 2 hours. In one of the embodiments, the condition of the thermal treatment may be heating at 400° C. to 450° C. for 1 hour to 2 hours.

Besides, the instant disclosure further provides a MTJ structure, which comprises a ferromagnetic reference layer, a tunneling barrier layer and a ferromagnetic free layer, and the tunneling barrier layer is disposed between the ferromagnetic reference layer and the ferromagnetic free layer; wherein, the ferromagnetic free layer is the foresaid ferromagnetic free layer of the instant disclosure.

Besides, the instant disclosure further provides an MRAM, which comprises a bottom electrode, a pinning layer, a ferromagnetic reference layer, a tunneling barrier layer, a ferromagnetic free layer, and a top electrode from bottom to top; wherein, the ferromagnetic free layer is the foresaid ferromagnetic free layer of the instant disclosure.

By adopting the ferromagnetic free layer of the instant disclosure as a free layer of the MTJ structure of MRAM element, the good magnetic property can be maintained even after being subjected to a thermal treatment at high temperature, such that the MTJ structure of MRAM element still can exert its original recording function.

In some embodiments of the instant disclosure, a material of the tunneling barrier layer comprises MgO or MgO based materials. In another embodiment of the instant disclosure, a material of the tunneling barrier layer comprises MgO. A thickness of the tunneling barrier layer may be 0.1 nm to 2.0 nm.

In some embodiments of the instant disclosure, a material of the ferromagnetic reference layer may be, but not limited to, selected from the group consisting of: Co, nickel (Ni), Fe, cobalt-iron (CoFe), cobalt-platinum (CoPt), cobalt-palladium (CoPd), cobalt-nickel (CoNi), iron-platinum (FePt), iron-palladium (FePd), iron-boron (FeB), cobalt-iron-boron (CoFeB) and any combinations thereof. A thickness of the ferromagnetic reference layer may be 0.1 nm to 2.0 nm.

In accordance with the instant disclosure, a material of the top electrode and a material of the bottom electrode may each independently be Ta, Ru, tantalum mononitride (TaN), titanium mononitride (TiN) or any combinations thereof, but are not limited thereto. One person skilled in the art can adjust the thicknesses of the top electrode and the bottom electrode based on the multilayer design of MRAM. The materials of the top and bottom electrodes may be the same or different, and the thicknesses of the top and bottom electrodes may be the same or different.

In some embodiments of the instant disclosure, the bottom electrode, the pinning layer, the ferromagnetic reference layer, the tunneling barrier layer, the ferromagnetic free layer, and the top electrode are sequentially stacked in a vertical arrangement. The magnetization directions of the ferromagnetic reference layer and of the ferromagnetic free layer may be parallel or perpendicular to the stacking direction.

In addition to the foresaid multilayers, MRAM may comprise, depending on needs, other additional layers, for example, but not limited to, a capping layer. The capping layer may be disposed between the ferromagnetic free layer and the top electrode, and the capping layer has a thickness in a range of 0.1 nm to 2.0 nm.

Besides, the instant disclosure further provides an iron-cobalt based target (FeCo based target), which comprises Fe, Co, B and an additive metal, and based on a total atomic number of the FeCo based target, a content of Co is more than 0 at % and less than 30 at %, a content of B is more than 10 at % and less than or equal to 35 at %, and a content of the additive metal is more than or equal to 2 at % and less than 10 at %; wherein, the additive metal comprises Mo, Re or a combination thereof; the FeCo based target has an α-type FeCo phase, and a ratio of an intensity of (200) crystal plane of the α-type FeCo phase to an intensity of (110) crystal plane of the α-type FeCo phase is more than 0.9.

By controlling the contents of Co and B of the FeCo based target, adding the specific content of the specific additive metal to the FeCo based target and controlling the ratio of the intensity in specific crystal plane of the α-type FeCo phase of the FeCo based target, the FeCo based target of the instant disclosure is used to prepare the foresaid ferromagnetic free layer of the instant disclosure, such that the prepared ferromagnetic free layer can be applied to a MTJ structure as a single layer, and has sufficient thermal stability to avoid a serious damage of its magnetic property after being subjected to a thermal treatment at high temperature, thereby ensuring the normal recording function of the MTJ structure.

In some embodiments of the instant disclosure, based on the total atomic number of the FeCo based target, the content of Co is more than or equal to 5 at % and less than 30 at %. In another embodiment of the instant disclosure, based on the total atomic number of the FeCo based target, the content of Co is more than or equal to 10 at % and less than 30 at %. In still another embodiment of the instant disclosure, based on the total atomic number of the FeCo based target, the content of Co is more than or equal to 15 at % and less than 30 at %. In still another embodiment of the instant disclosure, based on the total atomic number of the FeCo based target, the content of Co is more than or equal to 10 at % and less than or equal to 25 at %. In still another embodiment of the instant disclosure, based on the total atomic number of the FeCo based target, the content of Co is more than or equal to 15 at % and less than or equal to 25 at %.

In some embodiments of the instant disclosure, based on the total atomic number of the FeCo based target, the content of B is more than or equal to 10.2 at % and less than or equal to 35 at %. In another embodiment of the instant disclosure, based on the total atomic number of the FeCo based target, the content of B is more than 10 at % and less than 27 at %.

In some embodiments of the instant disclosure, based on the total atomic number of the FeCo based target, the content of the additive metal is more than or equal to 2 at % and less than or equal to 9.9 at %. In another embodiment of the instant disclosure, based on the total atomic number of the FeCo based target, the content of the additive metal is more than or equal to 2 at % and less than or equal to 9.8 at %.

In some embodiments of the instant disclosure, based on the total atomic number of the FeCo based target, a content of Fe is more than or equal to 30 at % and less than or equal to 70 at %. In another embodiment of the instant disclosure, based on the total atomic number of the FeCo based target, a content of Fe is more than or equal to 35 at % and less than or equal to 70 at %. In still another embodiment of the instant disclosure, based on the total atomic number of the FeCo based target, a content of Fe is more than or equal to 35 at % and less than or equal to 65 at %. In still another embodiment of the instant disclosure, based on the total atomic number of the FeCo based target, a content of Fe is more than or equal to 39 at % and less than or equal to 65 at %.

Preferably, the ratio of the intensity of (200) crystal plane to the intensity of (110) crystal plane of the α-type FeCo phase is more than 0.9 and less than 2.0. More preferably, the ratio of the intensity of (200) crystal plane to the intensity of (110) crystal plane of the α-type FeCo phase is more than 0.9 and less than 1.5. Even more preferably, the ratio of the intensity of (200) crystal plane to the intensity of (110) crystal plane of the α-type FeCo phase is more than 0.9 and less than 1.0. Even more preferably, the ratio of the intensity of (200) crystal plane to the intensity of (110) crystal plane of the α-type FeCo phase is more than or equal to 0.91 and less than or equal to 0.99. In the specification, a range represented by "a lower-endpoint value to an upper-endpoint value", if not particularly specified, indicates that the range is more than or equal to the lower-endpoint value and less than or equal to the upper-endpoint value. For example, "the thickness may be 0.1 nm to 2.0 nm" indicates that the thickness is "more than or equal to 0.1 nm and less than or equal to 2.0 nm".

Other objectives, advantages and novel features of the instant disclosure will become more apparent from the following detailed description when taken in conjunction with the accompanying drawings.

BRIEF DESCRIPTION OF THE DRAWINGS

FIG. 1 is a schematic view of a brief structure of a general MRAM element.

DETAILED DESCRIPTION OF THE PREFERRED EMBODIMENTS

Hereinafter, several examples are exemplified to illustrate the implementation of the instant disclosure. One person skilled in the art can easily realize the advantages and effects of the instant disclosure in accordance with the contents of the specification. Various modifications and variations could be made in order to practice or apply the instant disclosure without departing from the spirit and scope of the invention.

1 Examples 1 to 12 (E1 to E12): FeCo Based Target

According to the composition and the content listed in the following Table 1, suitable amount and purity higher than 99.95% of an iron material, a cobalt material, a boron material and an additive metal were weighed and placed into a vacuum melting furnace. Then, the temperature was elevated to about 1200° C. to 1600° C., and kept at the specific range for about 10 minutes to 30 minutes in order to fully melt those materials. Afterward, the melted material was poured into a mold to form a FeCo based pre-alloy.

Next, the FeCo based pre-alloy was subjected to a gas atomization under a condition of pressure of about $10^{-5}$ bar to $10^{-4}$ bar and temperature at about 1200° C. to 1600° C. to obtain a FeCo based powder. Afterward, the FeCo based powder was sintered according to the sintering method and condition listed in the following Table 1 to obtain a green compact. Then, the green compact was subjected to a roughing process by a wire cutting procedure, and then subjected to a finishing process by a grinding machine to obtain the FeCo based targets of E1 to E12. The said sintering mothed might be performed by hot pressing (HP) or hot isostatic pressing (HIP).

In the following Table 1, the composition of the FeCo based targets of E1 to E12 could be presented by a general formula "aFe-bCo-cB-dRe-eMo", wherein "a" represented the content of Fe in atomic percent relative to the total atom number of the FeCo based target; "b" represented the content of Co in atomic percent relative to the total atom number of the FeCo based target; "c" represented the content of B in atomic percent relative to the total atom number of the FeCo based target; "d" represented the content of Re in atomic percent relative to the total atom number of the FeCo based target; and "e" represented the content of Mo in atomic percent relative to the total atom number of the FeCo based target.

Comparative Examples 1 to 9 (C1 to C9): FeCo Based Target

The preparation methods of C1 to C9 were similar to those described in Examples. The main differences were that C1 to C9 adopted different target compositions, sintering methods and sintering conditions according to the following Table 1, and the rest of the preparation processes were the same as those described in Examples to obtain the FeCo based targets of C1 to C9.

and the intensity of the peak at about 2θ being 44.83°, which corresponds to (110) crystal plane of the α-type FeCo phase, of the XRD result of each group were recorded. Afterward, the recorded intensities were divided by each other to obtain the ratio of the intensity of (200) crystal plane to the intensity of (110) crystal plane of the α-type FeCo phase, which could be used to evaluate the intensity relationship between (200) crystal plane and (110) crystal plane of the α-type FeCo phase of the FeCo based target of each group. The results of E1 to E12 and C1 to C9 were listed in above Table 1. In the XRD result of C9, there was no obvious peak observed at about 2θ being 64.96°, and thus the intensity of (200) crystal plane of the α-type FeCo phase was 0, such that the ratio of the intensity of (200) crystal plane to the intensity of (110) crystal plane of the α-type FeCo phase was also 0.

TABLE 1

The composition, the sintering method, the sintering condition and the ratio of the intensity of (200) crystal plane to the intensity of (110) crystal plane of the α-type FeCo phase (presented by αFeCo(200)/αFeCo(110) in Table 1) of the FeCo based targets of E1 to E12 and C1 to C9.

| No. | Composition | Method | Sintering Temperature (° C.) | Pressure (MPa) | Duration (hr) | αFeCo(200)/αFeCo(110) |
|---|---|---|---|---|---|---|
| E1  | 62Fe—18Co—10.2B—9.8Mo   | HIP | 700  | 200 | 2.5 | 0.97 |
| E2  | 60Fe—20Co—10.2B—9.8Re   | HIP | 700  | 200 | 2.5 | 0.97 |
| E3  | 62.5Fe—17.5Co—12B—8Re   | HIP | 700  | 200 | 2.5 | 0.97 |
| E4  | 65Fe—15Co—15B—5Mo       | HIP | 900  | 175 | 2   | 0.92 |
| E5  | 65Fe—15Co—15B—5Re       | HIP | 900  | 175 | 2   | 0.93 |
| E6  | 60Fe—20Co—17.5B—2.5Re   | HIP | 900  | 175 | 2   | 0.94 |
| E7  | 60Fe—20Co—18B—2Re       | HIP | 900  | 175 | 2   | 0.91 |
| E8  | 60Fe—20Co—17B—3Mo       | HIP | 900  | 175 | 1   | 0.93 |
| E9  | 58Fe—20Co—20B—2Re       | HIP | 900  | 175 | 1   | 0.91 |
| E10 | 55Fe—15Co—25B—5Re       | HIP | 1000 | 175 | 1   | 0.94 |
| E11 | 44.5Fe—17.5Co—35B—3Re   | HIP | 1100 | 175 | 1   | 0.99 |
| E12 | 39Fe—24Co—35B—2Re       | HIP | 1100 | 175 | 1   | 0.91 |
| C1  | 64Fe—15Co—10B—11Re      | HIP | 700  | 200 | 3   | 0.80 |
| C2  | 57.5Fe—20Co—12.5B—10Re  | HIP | 700  | 200 | 3   | 0.86 |
| C3  | 60Fe—15Co—15B—10Mo      | HIP | 700  | 200 | 3   | 0.81 |
| C4  | 60Fe—15Co—15B—10Re      | HIP | 700  | 200 | 3   | 0.75 |
| C5  | 65Fe—15Co—15B—5Mo       | HP  | 900  | 100 | 4   | 0.88 |
| C6  | 65Fe—15Co—15B—5Re       | HP  | 900  | 100 | 4   | 0.88 |
| C7  | 64Fe—16Co—20B           | HP  | 900  | 100 | 4   | 0.89 |
| C8  | 60Fe—20Co—20B           | HP  | 900  | 100 | 4   | 0.89 |
| C9  | 46Fe—18Co—36B           | HP  | 1000 | 100 | 4   | 0    |

Analysis 1: The Intensity Relationship Between (200) Crystal Plane and (110) Crystal Plane of the α-Type FeCo Phase The FeCo based targets of E1 to E12 and C1 to C9 were adopted as samples for this analysis, and an X-ray diffractometer (XRD; model: Ultima IV; manufacturer: Rigaku) was used to analyze the intensity relationship between (200) crystal plane and (110) crystal plane of the α-type FeCo phase of each sample.

Specifically, a specimen with a length about 10 millimeters (mm) and a width about 10 mm was taken out from the spot about ½ radius distance to the center of target. Then, after the surface to be tested of the specimen was ground and cleaned, the specimen was placed into the XRD for analyzing with a step size of 2.4° and a scan range of 2θ being 20° to 80° to obtain the XRD result of each group. Then, the XRD result of each group was compared to the standard XRD card of α-type FeCo phase (No. 49-1567) published by joint committee on powder diffraction standards (JCPDS), and the intensity of the peak at about 2θ being 64.96°, which corresponds to (200) crystal plane of the α-type FeCo phase, As shown in above Table 1, the FeCo targets of E1 to E12 simultaneously controlled the technical features of the content of Co being more than 0 at % and less than 30 at %, the content of B being more than 10 at % and less than or equal to 35 at %, the content of the specific additive metal being more than or equal to 2 at % and less than 10 at %, and the ratio of the intensity of (200) crystal plane to the intensity of (110) crystal plane of the α-type FeCo phase being more than 0.9. Therefore, the FeCo targets of E1 to E12 could be used to prepare the ferromagnetic free layer described as follows, which could be further applied to a MTJ structure of MRAM element. In contrast, for the FeCo based targets of C1 to C4, the content of the additive metal was out of the range of more than or equal to 2 at % and less than 10 at % as claimed by the instant disclosure, and the ratio of the intensity of (200) crystal plane to the intensity of (110) crystal plane of the α-type FeCo phase did not meet the range of more than 0.9 as claimed by the instant disclosure; for the FeCo based targets of C5 and C6, although the composition met the requirements as claimed by the instant disclosure, the measured ratio of the intensity of (200)

crystal plane to the intensity of (110) crystal plane of the α-type FeCo phase of C5 and C6 were only 0.88, and were not higher than 0.9; and for the FeCo based targets of C7 to C9, the specific additive metal as claimed by the instant disclosure was not contained, the content of B of the FeCo target of C9 was out of the range of more than 10 at % and less than or equal to 35 at % as claimed by the instant disclosure, and the ratio of the intensity of (200) crystal plane to the intensity of (110) crystal plane of the α-type FeCo phase of C7 to C9 did not meet the range of more than 0.9 as claimed by the instant disclosure.

Examples 1A to 19A (E1A to E19A) and Comparative Examples 1A to 9A (C1A to C9A): Single Ferromagnetic Free Layer A clean silicon substrate having about 200 nm silicon dioxide ($SiO_2$) on the surface was put into a chamber of an ultra-high vacuum magnetron sputtering device (manufacturer: ULVAC Taiwan Inc.). After the chamber pressure was reduced to about $5 \times 10^{-8}$ torr, the FeCo based targets of the foresaid Examples and Comparative Examples were sputtered with a power of about 20 watt (W) and under a working pressure of about 3 mtorr, so as to deposit different single ferromagnetic free layers with different thickness on the silicon substrate, and the ferromagnetic free layers of E1A to E19A and C1A to C9A were obtained.

The main difference between the ferromagnetic free layers of E1A to E19A and the ferromagnetic free layers of C1A to C9A was that different FeCo based targets were respectively adopted and sputtered to form ferromagnetic free layers with different thickness. Specifically, E1A was formed by the FeCo based target of E1; E2A and E3A were formed by the FeCo based target of E2; E4A was formed by the FeCo based target of E3; E5A and E6A were formed by the FeCo based target of E4; E7A to E10A were formed by the FeCo based target of E5; E11A was formed by the FeCo based target of E6; E12A, E14A and E15A were formed by the FeCo based target of E7; E13A was formed by the FeCo based target of E8; and E16A to E19A were formed by the FeCo based targets of E9 to E12, respectively. C1A to C9A were formed by the FeCo based targets of C1 to C9, respectively. The composition and the thickness of the ferromagnetic free layers of E1A to E19A and C1A to C9A were listed in the following Table 2.

In the following Table 2, the composition of the ferromagnetic free layers of E1A to E19A and C1A to C9A could be presented by a general formula "a'Fe-b'Co-c'B-d'Re-e'Mo", wherein "a'" represented the content of Fe in atomic percent relative to the total atom number of the ferromagnetic free layer; "b'" represented the content of Co in atomic percent relative to the total atom number of the ferromagnetic free layer; "c'" represented the content of B in atomic percent relative to the total atom number of the ferromagnetic free layer; "d'" represented the content of Re in atomic percent relative to the total atom number of the ferromagnetic free layer; and "e'" represented the content of Mo in atomic percent relative to the total atom number of the ferromagnetic free layer.

Examples 1B to 19B (E1B to E19B) and Comparative Examples 1B to 9B (C1B to C9B): Laminated Structure Comprising Single Ferromagnetic Free Layer A clean silicon substrate having about 200 nm $SiO_2$ on the surface was put into a chamber of an ultra-high vacuum magnetron sputtering device (manufacturer: ULVAC Taiwan Inc.). After the chamber pressure was reduced to about $5 \times 10^{-8}$ torr, Mo target was sputtered with a power of about 30 W and under a working pressure of about 3 mtorr, so as to deposit a first Mo layer with 5 nm on the surface of the silicon substrate. Next, MgO target was sputtered with a power of about 200 W and under a working pressure of about 7 mtorr, so as to deposit a MgO layer with 2 nm on the surface of the first Mo layer. Next, the FeCo based targets of the foresaid Examples and Comparative Examples were sputtered with a power of about 20 W and under a working pressure of about 3 mtorr, so as to deposit different FeCo based layers, i.e., ferromagnetic free layers, with different thickness on the surface of the MgO layer. Last, Mo target was sputtered with a power of about 30 W and under a working pressure of about 3 mtorr, so as to deposit a second Mo layer with 5 nm on the surface of the FeCo based layer, and the laminated structures comprising one single ferromagnetic free layer of E1B to E19B and C1B to C9B were obtained on the silicon substrate. Taking the laminated structure comprising one single ferromagnetic free layer of E1B as an example for explanation, the FeCo based layer was the ferromagnetic free layer of E1A, the MgO layer was the tunneling barrier layer, and the first and the second Mo layers were the electrodes.

Comparative Examples 10B to 12B (C10B to C12B): Laminated Structure Comprising Composite Ferromagnetic Free Layer A clean silicon substrate having about 200 nm $SiO_2$ on the surface was put into a chamber of an ultra-high vacuum magnetron sputtering device (manufacturer: ULVAC Taiwan Inc.). After the chamber pressure was reduced to about $5 \times 10^{-8}$ torr, Mo target was sputtered with a power of about 30 W and under a working pressure of about 3 mtorr, so as to deposit a first Mo layer with 5 nm on the surface of the silicon substrate. Next, MgO target was sputtered with a power of about 200 W and under a working pressure of about 7 mtorr, so as to deposit a MgO layer with 2 nm on the surface of the first Mo layer. Next, FeCoB target was sputtered with a power of about 20 W and under a working pressure of about 3 mtorr, so as to deposit a first FeCoB layer with 1.5 nm on the surface of the MgO layer. Next, Mo target (for C10B), W target (for C11B), or Ta target (for C12B) were sputtered with a power of about 30 W and under a working pressure of about 3 mtorr, so as to deposit a second Mo layer with 0.5 nm, a W layer with 0.5 nm, or a Ta layer with 0.5 nm on the surface of the first FeCoB layer as a non-ferromagnetic spacing layer. Next, FeCoB target was sputtered with a power of about 20 W and under a working pressure of about 3 mtorr, so as to deposit a second FeCoB layer with 1.5 nm on the surface of the second Mo layer, the W layer, or the Ta layer. Last, Mo target was sputtered with a power of about 30 W and under a working pressure of about 3 mtorr, so as to deposit a third Mo layer (for C10B) with 5 nm, or a second Mo layer (for C11B and C12B) with 5 nm on the surface of the second FeCoB layer, and the laminated structures comprising composite ferromagnetic free layer of C10B to C12B were obtained on the silicon substrate.

Taking the laminated structure comprising composite ferromagnetic free layer of C10B as an example for explanation, the first FeCoB layer, the second Mo layer and the second FeCoB layer were the ferromagnetic free layer with composite-layered structure, the MgO layer was the tunneling barrier layer, and the first and the third Mo layers were the electrodes. The FeCoB target consisted of Fe, Co and B, and based on a total atomic number of the FeCoB target, a content of Fe was 60 at %, a content of Co was 20 at % and a content of B was 20 at %. The composition and the thickness of the ferromagnetic free layers of the laminated structures of C10B to C12B were listed in the following Table 2, and the said thickness of the ferromagnetic free layer was a sum of a thickness of the first FeCoB layer, a thickness of the non-ferromagnetic spacing layer and a thickness of the second FeCoB layer.

TABLE 2

The composition and the thickness of the ferromagnetic free layers of E1A to E19A and C1A to C9A, the composition and the thickness of the composite ferromagnetic free layers of the laminated structures of C10B to C12B, and the anisotropic field (shown as $H_k$ in Table 2) and the quantitative indicator of effective magnetic layer (shown as $K_u t$ in Table 2) of the laminated structures of E1B to E19B and C1B to C12B after being subjected to a thermal treatment at high temperature.

| | Ferromagnetic free layer | | Laminated structure | |
|---|---|---|---|---|
| No. | Composition | Thickness (nm) | $H_k$ (kOe) | $K_u t$ (erg/cm²) |
| E1A/E1B | 62Fe—18Co—10.2B—9.8Mo | 1.8 | 5.60 | 0.32 |
| E2A/E2B | 60Fe—20Co—10.2B—9.8Re | 1.8 | 6.00 | 0.31 |
| E3A/E3B | 60Fe—20Co—10.2B—9.8Re | 2.4 | 4.01 | 0.31 |
| E4A/E4B | 62.5Fe—17.5Co—12B—8Re | 2 | 5.90 | 0.36 |
| E5A/E5B | 65Fe—15Co—15B—5Mo | 1.9 | 6.00 | 0.34 |
| E6A/E6B | 65Fe—15Co—15B—5Mo | 2 | 4.90 | 0.30 |
| E7A/E7B | 65Fe—15Co—15B—5Re | 1.8 | 8.00 | 0.42 |
| E8A/E8B | 65Fe—15Co—15B—5Re | 2 | 6.00 | 0.36 |
| E9A/E9B | 65Fe—15Co—15B—5Re | 2.2 | 5.00 | 0.34 |
| E10A/E10B | 65Fe—15Co—15B—5Re | 2.3 | 4.00 | 0.31 |
| E11A/E11B | 60Fe—20Co—17.5B—2.5Re | 1.5 | 5.60 | 0.32 |
| E12A/E12B | 60Fe—20Co—18B—2Re | 2 | 5.50 | 0.34 |
| E13A/E13B | 60Fe—20Co—17B—3Mo | 1.8 | 5.37 | 0.30 |
| E14A/E14B | 60Fe—20Co—18B—2Re | 1.8 | 5.31 | 0.30 |
| E15A/E15B | 60Fe—20Co—18B—2Re | 1.5 | 5.50 | 0.34 |
| E16A/E16B | 58Fe—20Co—20B—2Re | 1.5 | 5.67 | 0.31 |
| E17A/E17B | 55Fe—15Co—25B—5Re | 2 | 5.00 | 0.32 |
| E18A/E18B | 44.5Fe—17.5Co—35B—3Re | 2.1 | 5.30 | 0.35 |
| E19A/E19B | 39Fe—24Co—35B—2Re | 1.5 | 5.00 | 0.30 |
| C1A/C1B | 64Fe—15Co—10B—11Re | 2 | 3.00 | 0.18 |
| C2A/C2B | 57.5Fe—20Co—12.5B—10Re | 2 | 3.00 | 0.18 |
| C3A/C3B | 60Fe—15Co—15B—10Mo | 2 | 2.00 | 0.12 |
| C4A/C4B | 60Fe—15Co—15B—10Re | 1.5 | 3.70 | 0.13 |
| C5A/C5B | 65Fe—15Co—15B—5Mo | 2.5 | 0.00 | 0.00 |
| C6A/C6B | 65Fe—15Co—15B—5Re | 2.5 | 3.00 | 0.26 |
| C7A/C7B | 64Fe—16Co—20B | 1.8 | 0.00 | 0.00 |
| C8A/C8B | 60Fe—20Co—20B | 1.5 | 3.00 | 0.20 |
| C9A/C9B | 46Fe—18Co—36B | 1.5 | 2.00 | 0.07 |
| C10B | 60Fe—20Co—20B/Mo /60Fe—20Co—20B | 3.5 | 4.87 | 0.30 |
| C11B | 60Fe—20Co—20B/W/ 60Fe—20Co—20B | 3.5 | 4.13 | 0.25 |
| C12B | 60Fe—20Co—20B/Ta/ 60Fe—20Co—20B | 3.5 | 3.33 | 0.20 |

Analysis 2: Analysis of the Magnetic Property after Thermal Treatment at High Temperature The laminated structures of E1B to E19B and C1B to C12B were adopted for this analysis to evaluate the influence of the ferromagnetic free layer with different compositions and thickness on the magnetic property of the laminated structure comprising the same.

Specifically, the laminated structures with a length of 1 centimeter (cm) and a width of 1 cm of E1B to E19B and C1B to C12B were adopted as specimens. Then, each specimen was put into a vacuum annealing furnace, and a thermal treatment at about 450° C. was conducted for about an hour when the pressure of the furnace was reduced to $1 \times 10^{-5}$ torr. After the thermal treatment, each specimen was measured with a vibrating sample magnetometer (VSM, manufacturer: Lakeshore, model: MicroMag 3900) to obtain their M-H hysteresis curves, and then the anisotropic field ($H_k$) and the magnetocrystalline anisotropy constant ($K_u$) were also obtained. After that, the quantitative indicator of effective magnetic layer ($K_u t$) was further obtained by multiplying the $K_u$ and the thickness (t) of the ferromagnetic free layer of the laminated structure.

The anisotropic field and the quantitative indicator of effective magnetic layer of the laminated structures of E1B to E19B and C1B and C12B measured after being subjected to a 450° C. thermal treatment were respectively represented by $H_k$ and $K_u t$ and listed in the above Table 2, and the unit of the $H_k$ was kOe and the unit of the $K_u t$ was erg/cm².

As one person skilled in the art could understand that for the composite ferromagnetic free layer, such as a composite ferromagnetic free layer having non-ferromagnetic spacing layers disposed between multiple FeCoB layers, the non-ferromagnetic spacing layer did not substantially affect the magnetic property of the entire composite ferromagnetic free layer. Accordingly, when discussing the quantitative indicator of effective magnetic layer, i.e., the $K_u t$, the thickness of non-ferromagnetic spacing layer usually would not be considered. Therefore, the $K_u t$ of C10B to C12B were obtained by multiplying a sum of the thickness of the first FeCoB layer and the thickness of the second FeCoB layer, which equaled to 3 nm, and the $K_u$.

Discussion of Results

As shown in Table 2, even though E1B to E19B adopted one single ferromagnetic free layer, the laminated structures comprising the same still had good magnetic properties as the $H_k$ being more than or equal to 4.0 kOe and the $K_u t$ being more than or equal to 0.3 erg/cm² after subjected to a thermal treatment at high temperature. Accordingly, by simultaneously controlling the contents of Co and B of the ferromagnetic free layer, adding the specific content of the specific additive metal to the ferromagnetic free layer and controlling the thickness of the ferromagnetic free layer within a specific range, the ferromagnetic free layer could be applied to a MTJ structure of MRAM element as a single layer, and still had good magnetic property after being subjected to a thermal treatment at high temperature, which further ensured the normal recording function of the MTJ structure.

Besides, in further comparison of E1B to E19B and C10B to C12B, E1B to E19B adopted single ferromagnetic free layer, while C10B to C12B adopted composite ferromagnetic free layer with a multi-layered structure, which was well-known and commonly adopted in the prior art. Nevertheless, the $H_k$ and $K_u t$ of E1B to E19B after subjected to a thermal treatment at high temperature were comparable to or even higher than those of C10B to C12B. Accordingly, the single ferromagnetic free layers of E1A to E19A actually could replace the composite layer with multi-layered structure in the prior art, and thus the composite layer was no more needed for maintaining the expected thermal stability. Therefore, with the single ferromagnetic free layers of E1A to E19A, the manufacturing process with high difficulty and high cost of MRAM element would be avoided, and the good magnetic property and thermal stability would also sustain after a thermal treatment at high temperature.

Besides, in further comparison of E1B to E19B and C7B to C9B, in the same case of adopting one single ferromagnetic free layer, the composition of the ferromagnetic free layers of C7B to C9B did not contain the additive metal as claimed by the instant disclosure, and the content of B of the ferromagnetic free layer of C9B was out of the range of more than 10 at % and less than or equal to 35 at % as claimed by the instant disclosure. Accordingly, the $H_k$ (0.00 kOe, 3.00 kOe and 2.00 kOe, respectively) and $K_u t$ (0.00 erg/cm², 0.2 erg/cm² and 0.07 erg/cm², respectively) of C7B to C9B after a thermal treatment at high temperature were worse than those of E1B to E19B, which indicated the inferior magnetic property after the thermal treatment at high temperature, and the problem of insufficient thermal stability when further applied in MRAM element.

Besides, in further comparison of E1B to E19B and C5B and C6B, in the same case of adopting one single ferromagnetic free layer, the composition of the ferromagnetic free layers of C5B and C6B were in accord with the requirements as claimed by the instant disclosure. However, the thickness of ferromagnetic free layers of C5B and C6B were out of the range of more than or equal to 1.5 nm and less than 2.5 nm as claimed by the instant disclosure. Accordingly, the $H_k$ of C5B and C6B after a thermal treatment at high temperature were 0.00 kOe and 3.00 kOe, respectively; and the $K_u t$ of C5B and C6B after a thermal treatment at high temperature were 0.00 erg/cm² and 0.26 erg/cm², respectively, which indicated obviously worse magnetic properties than those of E1B to E19B.

Besides, in further comparison of E1B to E19B and C1B to C5B, in the same case of adopting one single ferromagnetic free layer, although the composition of the ferromagnetic free layers of C1B to C5B contained the specific additive metal, the contents of the specific additive metal of C1B to C5B were out of the range of more than or equal to 2 at % and less than 10 at % as claimed by the instant disclosure. Accordingly, the $H_k$ of C1B to C5B after a thermal treatment at high temperature could not be higher than 3.70 kOe; and the $K_u t$ of C1B to C5B after a thermal treatment at high temperature could not be higher than 0.18 erg/cm², which also indicated obviously worse magnetic properties than those of E1B to E19B.

In summary, by controlling the composition and the thickness of the ferromagnetic free layer as claimed by the instant disclosure, the ferromagnetic free layer of the instant disclosure can be applied in a MTJ structure as a single layer, and has sufficient thermal stability to avoid a serious damage of its magnetic property after being subjected to a thermal treatment at high temperature, thereby ensuring the normal recording function of the MTJ structure. Meanwhile, as the ferromagnetic free layer of the instant disclosure is not a composite layer having multi-layered structure, the ferromagnetic free layer of the instant disclosure also has advantages of relatively low difficulty and cost of the manufacturing process, which further makes MRAM element have better mass productivity and applicability, thereby having high developmental potential and value.

Even though numerous characteristics and advantages of the present invention have been set forth in the foregoing description, together with details of the structure and features of the invention, the disclosure is illustrative only. Changes may be made in the details, especially in matters of shape, size, and arrangement of parts within the principles of the invention to the full extent indicated by the broad general meaning of the terms in which the appended claims are expressed.

What is claimed is:

1. A FeCo based target, comprising Fe, Co, B and an additive metal, and based on a total atomic number of the FeCo based target, a content of Co is more than 0 at % and less than 30 at %, a content of B is more than 10 at % and less than or equal to 35 at %, and a content of the additive metal is more than or equal to 2 at % and less than 10 at %;

wherein, the additive metal comprises Mo, Re or a combination thereof; the FeCo based target has an α-type FeCo phase, and a ratio of an intensity of (200) crystal plane of the α-type FeCo phase to an intensity of (110) crystal plane of the α-type FeCo phase is more than 0.9.

2. The FeCo based target as claimed in claim 1, wherein based on the total atomic number of the FeCo based target, the content of B is more than 10 at % and less than 27 at %.

\* \* \* \* \*